Dec. 2, 1969  M. F. SERNA  3,481,091
FLOOR BEAM CONSTRUCTION UTILIZING POST-STRESSED BEAMS
FORMED OF AN ASSEMBLY OF HOLLOW ELEMENTS
Filed March 4, 1968

INVENTOR:
MIGUEL FISAC SERNA
BY
ATTORNEY

United States Patent Office 3,481,091
Patented Dec. 2, 1969

3,481,091
FLOOR BEAM CONSTRUCTION UTILIZING POST-STRESSED BEAMS FORMED OF AN ASSEMBLY OF HOLLOW ELEMENTS
Miguel Fisac Serna, Madrid, Spain, assignor to Hueco, S.A., Vich, Barcelona, Spain, a corporation of Spain
Filed Mar. 4, 1968, Ser. No. 710,122
Int. Cl. E04c *3/101, 3/26;* E04b *5/04*
U.S. Cl. 52—228
2 Claims

ABSTRACT OF THE DISCLOSURE

A floor beam construction using an assembly of hollow elements having a cross section in the form of an inverted trapezoid, the height of which is about three times the length of the upper base, the lower base being about two-thirds the length of the upper base; the upper face of the elements is plane and has laterally extending projections formed with straight edges, for placement of the beams side by side. Longitudinal openings are formed in zones of greater thickness in the upper and lower parts of the elements to receive post-stressing reinforcement rods.

---

The present invention relates to a floor construction, and more particularly to a floor construction utilizing hollow floor beams built up of separate hollow elements which are assembled together in long beams connected by post-stressed tie rods. The floor of the present invention is particularly applicable to support heavy loads in industrial buildings, with large spans, for example between ten and twenty meters long.

SUMMARY OF THE INVENTION

A plurality of beams are placed side-by-side, each beam being made up of individual elements stacked end for end. The elements, in accordance with the present invention, have a particular shape and dimension, and form, in cross section, an inverted trapezoid, having the lower flat surface dimension approximately two-thirds the dimension of the upper flat surface, a height dimension approximately three times the upper flat surface dimension; the lower flat surface has greater thickness than the upper flat surface; and lateral projections are provided at the upper flat surface, having straight edges to match the beams laterally side-by-side, and formed integral with the upper flat surface, so that a continuous beam-supported flat surface will be formed over which later reinforced cement can be poured. Reinforcement rods are located at the respective corners of the trapezoid passing through longitudinally aligned holes. In case only a small load has to be supported, or the spans are short, the beams can be separated slightly from each other.

DESCRIPTION OF THE DRAWINGS

In order to enable the invention to be better understood, a description of an example of an embodiment for industrial use is given in which reference is made to the annexed drawings.

In the said drawings.

In the said figures various elements are shown with the following references:
(1) The element which constitutes the subject of the present patent application.
(2) Hollow zone.
(3) Upper plane face of the element.
(4) Longitudinal orifices.
(5) Rods for post-stressing.
(6) Round steel bars.
(7) Layer of concrete.

Figure 1:
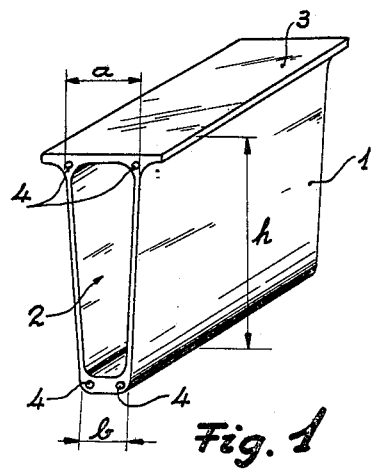
FIGURE 1 shows a hollow element, constructed in accordance with the invention.

In FIGURE 1 there is represented a hollow element in accordance with the invention, which is formed by a piece 1 which is prefabricated and made of ceramic or of concrete. The said piece has, in its cross-section, the form of an inverted trapezoid, that is to say with the lower Base $b$ being smaller than the upper base.

The relationship existing between the dimension of the said section is approximately:

$$a = \tfrac{1}{3} h$$
$$b = \tfrac{2}{3} a$$

The said pieces 1 have their hollow part 2 limited by a wall of substantially uniform thickness, except in the lower part, where the wall is thicker. The upper face 3 is plane and is extended laterally by means of fins, or projections whose edges are straight.

The lower part is of greater thickness. Longitudinal orifices 4 are formed in line with the horizontal walls which serve to house the rods 5 employed for post-stressing.

Figure 2:
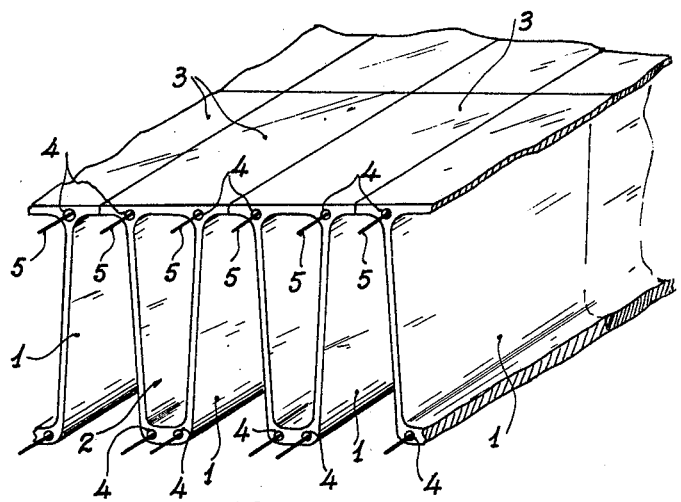
FIGURE 2 shows the general arrangement of hollow elements, as shown in FIGURE 1, for the constitution of floor beams.

The pieces thus constituted are placed end to end, as is shown in FIGURE 2, connected by means of the post-stressing cables or tie rods 5 to form the tubular beams. The beams are then placed laterally in order to form an upper plane surface.

Figure 3:
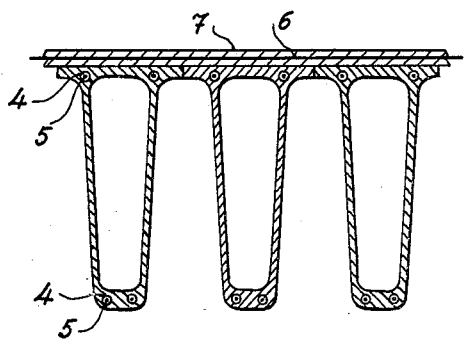
FIGURE 3 shows a cross-section of floor beams constructed in accordance with the invention.

As is shown in FIGURE 3, the round bars 6 may be placed on surface 3, and subsequently a layer of compressed concrete is applied thereover to form a poured beam supported floor surface.

What is claimed is:
1. In a floor construction comprising a plurality of post-stressed beams located side-by-side, each beam being formed of end-to-end stacked, aligned hollow elements having longitudinally extending openings therein, and post-stressed reinforcing means passing through said openings and interconnecting said elements together;
the improvement wherein
the elements, each, are, in cross-section inverted trapezoids dimensioned to have a lower flat surface dimension of approximately two-thirds the dimension of the upper flat surface, and a height dimension approximately three times greater than the dimension of the upper flat surface, the lower flat surface being of greater thickness than the upper flat surface;
and lateral projections are provided integral with the upper flat surface and having straight edges to provide a flat-extended supporting surface.
2. Floor construction according to claim 1 wherein said lateral projections of adjacent beams touch each other, and a surface of reinforced cement is located over said beams.

(References on following page)

References Cited

UNITED STATES PATENTS

| | | | |
|---|---|---|---|
| 2,075,633 | 3/1937 | Anderegg | 52—229 |
| 2,102,447 | 12/1937 | Whitacre | 52—228 |

FOREIGN PATENTS

| | | |
|---|---|---|
| 629,234 | 9/1949 | Great Britain. |
| 428,907 | 1/1948 | Italy. |
| 198,362 | 9/1938 | Switzerland. |

OTHER REFERENCES

Engineering News-Record, TA 1.E61, Oct. 16, 1952, page 36, 52—174.

ALFRED C. PERHAM, Primary Examiner

U.S. Cl. X.R.

52—229, 433